United States Patent Office 3,261,705
Patented July 19, 1966

3,261,705
METHOD OF PRODUCING AN EMULSIFIABLE GEL
John Gallagher, 104 Cliff Drive, Fairhope, Ala.
No Drawing. Filed Mar. 1, 1965, Ser. No. 436,366
5 Claims. (Cl. 106—212)

This application is a continuation-in-part of my application, Serial No. 216,983, filed August 15, 1962, for Emulsified Shellac.

This invention relates to a method of producing an emulsifiable shellac or gel which is soluble in water yet which evidences all of the hardening properties of commercial shellac.

The product is a gel which forms a stable emulsion with water which dries to a tough, adherent film and which may be used for coating porous or other surfaces. The gel is formed from low-cost, readily available components by a procedure which is set out in detail further on in this specification.

The emulsion formed between the gel product and water may be used as an improved compound for sealing and water-proofing concrete or cement blocks, as a base coat. It may be used for sealing asphalt, coal tar or wax grease surfaces and for sealing and water-proofing paper products such as Celotex, wallboard and similar porous materials. It is useful for water-proofing craft composition papers and as a protective coating for corrosion susceptible metals such as brass, aluminum, copper, nickel, or various galvanized metals.

The emulsion is non-toxic and non-corrosive and dries to a hard, transparent surface.

The end product of the method is a gel which is readily dispersible in water or alcohol and which when so dispersed produces a stable emulsion which may be used in the same fashion as the standard commercial shellac.

It is therefore a primary object of this invention to produce a shellac gel which is readily dispersible in water to produce a stable emulsion.

It is a further object of this invention to produce such a gel emulsion which is suitable for the coating of many different types of surfaces and which will dry thereon to a hard, transparent, corrosion-resistant and impermeable surface.

Other and further objects of this invention will become apparent as this specification proceeds.

Broadly speaking, the process comprises combining 90–100 grams, preferably about 97 grams, of powdered corn starch ($C_6H_{10}O_5$), coarse grain preferably, with 1½–2 fluid ounces of glacial acetic acid ($CH_3COOH$) until a very heavy paste is produced. To this paste is added 16 fluid ounces of pure gum white or orange shellac (four pound cut with one gallon of denatured alcohol). To this mixture is then added 4 fluid ounces of ammonium hydroxide ($NH_4OH$) (29% aqua ammonia solution) and the mixture is then thoroughly mixed. 48 fluid ounces of water is then added until the resin is precipitated into a gel. The liquid is then poured off and the resulting gel is readily dispersible in water or alcohol to provide a stable emulsion which may be utilized as a protective coating for many different types of surfaces and which dries to a hard, transparent and non-corrosive surface.

The following formula is preferred to produce the water soluble gel which is the subject of this invention:

Ingredients: Measure for volume
- (#1) Powdered corn starch ($C_6H_{10}O_5$), grams__ 97
- (#2) Glacial acetic acid ($CH_3COOH$), fluid ozs. _____ 1½
- (#3) White shellac (4 lbs.) cut with denatured alcohol (1 gal.), fluid ozs. _____ 16
- (#4) Ammonium hydroxide ($NH_4OH$) (29% aqua ammonia solution), fluid ozs. __ 4
- (#5) Water, fluid ozs. _____ 48

In a cool medium, neither starch nor shellac resin separately provide a stable suspension in acid, neutral or alkaline medium. However, I have discovered that when the two are combined in the presence of alcohol and acetic acid and are then neutralized with ammonia that a gel is formed on the addition of water to the neutral mixture. After pouring the water and impurities off of this gel, the gel can be readily dispersed in pure water to provide a stable emulsion.

The chemical nature of the non-aqueous phase of this emulsion is probably complex. There is no separation of phases on long standing and it thus appears to be a true colloid. The electrolyte ammonium acetate formed on the neutralization of acetic acid by ammonia plays an important role in stabilizing the colloidal suspension. When the acetic acid is omitted a gel is formed which does not produce a stable emulsion with water.

The emulsion produced is a non-toxic and non-corrosive and has a slight pleasant odor, probably due to the formation of a slight amount of ester between the acetic acid and the alcohol.

The various ingredients of the compound subtend the following roles in the production of the final product:

(1) *Mixture of starch with glacial acetic acid.*—There is no chemical reaction between the starch and the acetic acid. The acetic acid assists in bringing about a finely divided dispersion of the starch particles. As a solvent, acetic acid is mixed with alcohol and will not cause coagulation of the shellac resin in the next step. Analogous compounds may be used, but the best results are obtained with glacial acetic acid.

(2) *Addition of alcoholic shellac suspension.*—The addition of the alcoholic shellac suspension brings the shellac and starch particles together in a non-aqueous medium. An ester is formed (ethyl acetate), which is recognizable by its fruity odor, between the acetic acid and the ethyl alcohol.

(3) *Addition of ammonia hydroxide (29% aqua ammonia solution).*—By the addition of ammonium hydroxide the remaining acetic acid is neutralized, producing the salt, ammonium acetate. The shellac is "solubilized" by the reaction of the alkaline substance (ammonium hydroxide) with the acid group of the resins. Other alkaline substances could be used but ammonium hydroxide produces excellent results.

(4) *Addition of a large volume of water.*—By the addition of water (48 fluid ounces) the nature of the medium is changed from organic to aqueous. A gel is thus formed which sinks to the bottom of the container, leaving a clear liquid above. The liquid contains water, alcohol and most of the ammonium acetate. The solid phase of the gel contains starch and shellac resin modified by reaction with ammonium hydroxide. Traces of ethyl acetate and ammonium acetate are also present in this gel.

(5) *Dispersion of the gel.*—The liquid phase of step 4 is decanted leaving the solid phase of the gel which may be dispersed into a liquid colloidal suspension of the desired viscosity by vigorous stirring with the desired amount of water. The end product is a stable water emulsion of the gel which may be used to coat many different types of surfaces, as aforesaid, and which dries to a hard, transparent and impervious finish.

It will thus be seen that the process of producing the readily water emulsifiable gel of the present invention comprises the combination of 90–100 grams of coarse grain powdered corn starch with one and a half fluid ounces of glacial acetic acid until a heavy paste is obtained. To this heavy paste is then added sixteen fluid ounces of pure gum (white or orange) shellac (4 pounds cut with 1 gal. of denatured alcohol). To this compound is then added 4 fluid ounces of ammonium hydroxide (NH₄OH) (29% aqua ammonia solution) and the mixture is thoroughly mixed. To this mixture is then added water (48 fluid ounces) until the resin is precipitated back into a solid. After precipitation of the resin gel, which sinks to the bottom of the container, a clear liquid is left above the gel in the container. The liquid and impurities are then poured off, leaving the gel in the bottom of the container which is then ready to be emulsified in water.

The emulsion formed between the gel and added water may be varied in viscosity by vigorously stirring the gel into the desired amount of water, the viscosity varying inversely to the amount of water added. The resulting stable emulsion of resin gel in water may be used to coat many different types of surfaces, as aforesaid, then dries to a hard, transparent surface.

The emulsion has been found to be usable as a preservative coating on fruit (satsumas). After coating and hardening of the emulsion the fruit was found to be well preserved and eatable after a period of three months, without refrigeration.

It is also suitable as a preservative coating for other produce; for example, potatoes, and other vegetables of this type.

The invention is susceptible of modification without departing from the spirit thereof. Thus, 2 fluid ounces of acetic acid may be utilized but for best results 1½ fluid ounces are desirable. Three or five lb. cut shellac may be substituted for 4 lb. cut. A 5 lb. cut shellac produces a greater amount of resin, but 4 lb. cut is more economical.

While it is preferred to utilize 48 fluid ounces of water to precipitate the gel, the volume of water may be increased without adversely affecting the product.

Up to eight fluid ounces of ammonium hydroxide may be used in the process, but for best results and economical operation four fluid ounces are preferred.

Attention is directed to the appended claims for a limitation of the scope of this invention.

What is claimed is:

1. A method of forming a water emulsified gel wherein 90 to 100 grams of powdered corn starch are combined with about 1½ fluid ounces of glacial acetic acid until a heavy paste is formed, adding to said paste 16 fluid ounces of pure gum shellac, four pound cut in one gal. denatured alcohol, adding 4 fluid ounces of ammonium hydroxide, 29% aqua ammonia solution, and stirring until thoroughly mixed and then adding about 48 ounces of pure water and allowing the resin to precipitate out into a solid.

2. The method of forming a water emulsifiable gel which comprises mixing about 97 grams of coarse grain powdered corn starch with 1½ fluid ounces of glacial acetic acid until a heavy paste is formed, adding to this paste 16 fluid ounces of white shellac, 4 pound cut with one gal. denatured alcohol, adding 4 fluid ounces of ammonium hydroxide, 29% aqua ammonia solution, and stirring until thoroughly mixed, then adding about 48 ounces of water until the resin is precipitated out into a solid gel, pouring off the liquid and recovering the gel.

3. The method of forming a water emulsifiable gel which comprises mixing about 97 grams of corn starch and about 1½ fluid ounces of glacial acetic acid until a heavy paste is obtained, adding to this paste 16 fluid ounces of orange shellac, 4 pound cut with one gal. of denatured alcohol, adding 4 fluid ounces of ammonium hydroxide, 29% aqua ammonia solution, and stirring the mixture until thoroughly mixed and then adding about 48 fluid ounces of water to the mixture until the resin produced is precipitated as a gel, pouring off the liquid and retaining the precipitated gel.

4. A method as in claim 1 in which an excess of water over 48 fluid ounces is added to the mixture to precipitate the gel.

5. A method of forming a water emulsifiable gel which comprises mixing about 95 grams of corn starch with about 2 fluid ounces of glacial acetic acid until a heavy paste is formed, adding to this paste about 16 ounces of gum shellac, 3–5 pound cut with one gal. denatured alcohol, adding about 4 fluid ounces of ammonium hydroxide and stirring until thoroughly mixed, then adding a large volume of water until the resin is precipitated out as a solid gel, pouring off the liquid and recovering the gel.

References Cited by the Examiner

UNITED STATES PATENTS

| | | | |
|---|---|---|---|
| 2,425,023 | 8/1947 | Bassford | 106—238 |
| 2,834,770 | 5/1958 | Kolkhof-Rose | 106—238 |

ALEXANDER H. BRODMERKEL, *Primary Examiner.*

J. B. EVANS, *Assistant Examiner.*